(12) United States Patent
De Lamaziere et al.

(10) Patent No.: US 7,752,086 B2
(45) Date of Patent: Jul. 6, 2010

(54) METHOD AND DEVICE ENABLING RAPID EXECUTION OF A MULTIPLICITY OF PHYSICAL ORDERS

(75) Inventors: Alain Wiesenbach De Lamaziere, Mezy-sur-Seine (FR); Sebastien Valoggia, Saint-Genevieve-des-Bois (FR)

(73) Assignee: L4 Epsilon (FR)

( * ) Notice: Subject to any disclaimer, the term of this patent is extended or adjusted under 35 U.S.C. 154(b) by 920 days.

(21) Appl. No.: 10/859,391

(22) Filed: Jun. 2, 2004

(65) Prior Publication Data
US 2005/0004704 A1     Jan. 6, 2005

Related U.S. Application Data

(63) Continuation of application No. PCT/FR02/04154, filed on Dec. 3, 2002.

(30) Foreign Application Priority Data

Dec. 3, 2001   (FR)   .................................. 01 15599

(51) Int. Cl.
*G06Q 10/00*   (2006.01)
(52) U.S. Cl. .............................. 705/28; 705/7; 209/552; 209/606
(58) Field of Classification Search ........................ None
See application file for complete search history.

(56) References Cited

U.S. PATENT DOCUMENTS

| | | | |
|---|---|---|---|
| 5,411,151 A | 5/1995 | Sasada | |
| 5,794,213 A | 8/1998 | Markman | |
| 5,903,464 A * | 5/1999 | Stingel et al. | 700/215 |
| 5,953,234 A | 9/1999 | Singer et al. | |
| 6,321,138 B1 | 11/2001 | Livesay et al. | |
| 6,425,226 B1 * | 7/2002 | Kirschner | 53/445 |
| 6,974,928 B2 * | 12/2005 | Bloom | 209/583 |
| 7,287,001 B1 * | 10/2007 | Falls et al. | 705/22 |
| 2002/0116372 A1 * | 8/2002 | Ladouceur et al. | 707/3 |

FOREIGN PATENT DOCUMENTS

EP    0 227 569 A1    7/1987

\* cited by examiner

*Primary Examiner*—F. Zeender
*Assistant Examiner*—Luna Champagne
(74) *Attorney, Agent, or Firm*—DLA Piper LLP (US)

(57) ABSTRACT

A method of distributing products, including computer processing content of the orders including regrouping the orders into groups of orders, and ungrouping the content of each order group into a order subgroups; regrouping the products, including performing a collection of the products, reading the identifier of each collected product and arranging each to obtain a concordance between the product groups and the order groups, ungrouping the products, including for each product group performing a collection of the products, reading the identifier of each collected product and arranging each in a compartment associated with a product subgroup to obtain a concordance between the product subgroups and the order subgroups, and a step of final separation including for each product subgroup performing a collection of each of the products, reading the identifier and arranging each in a compartment associated with a physical order.

19 Claims, 5 Drawing Sheets

METHOD AND DEVICE ENABLING RAPID EXECUTION OF A MULTIPLICITY OF PHYSICAL ORDERS

RELATED APPLICATION

This is a continuation of International Application No. PCT/FR02/04154, with an international filing date of Dec. 3, 2002 (WO 03/047975, published Jun. 12, 2003), which is based on French Patent Application No. 01/15599, filed Dec. 3, 2001.

FIELD OF THE INVENTION

This invention pertains to the field of execution or fulfillment of lists of objects constituting physical orders, i.e., collecting and shipping of products ordered by ordering parties. The invention pertains more particularly to a method for distributing products enabling, by handling and moving the products, rapid collection of the products, each of which has a bar code identifier prior to shipment, such that each final collection of products corresponds to a list of products itself corresponding to a physical order, the products originating from one or more suppliers or one or more stocks. The invention also pertains to a device for implementing the method according to the invention.

BACKGROUND

Already known in the prior art are methods enabling fulfillment of a multiplicity of orders. Many of the methods are based on the following principle: "the order will search for the product." This is the case notably of the so-called "picking" methods and their variants.

Known also in the prior art is the distribution method which is based on the opposite principle: "the product is directed to the order". In this latter method, the received products are sorted by reference. Then the preparer takes each reference one by one and places the products on the corresponding order shipping supports. When all of the references have been distributed all of the orders are ready. The products in stock are collected in a global manner so that they also can be distributed reference by reference. This method is very productive in certain particular cases.

However, generally speaking, distribution of products is not effected for fewer than 20 orders or more than 60 orders. These thresholds condition the capacity to be productive. The references are distributed one after the other on the same supports which generates an accumulation of the distribution time and a saturation facing the order shipping supports.

Thus, when it is desired to process a large number of orders over a very short period of time (for example, 5,000 orders per day) corresponding to 35,000 references in stock and 200,000 references incoming on a just in time basis, the distribution method is obviously completely inadequate.

It would be possible to launch orders by waves of 50—i.e., 100 waves—and then to effect distribution after sorting the references. However, the small number of products per reference and per wave would make the system completely absurd and industrially unattainable.

FR 2 671 201 and corresponding EP 494 014 disclose a method for preparing lists of objects to be loaded into containers, according to which the objects are collected by predetermined quantities in boxes of multiple means of storing objects respectively, and preparation relative to one of the stocking means is assisted by the means for controlling objects that can be moved before the storage means.

That method performs weighing the quantity of objects collected in a box directly from the container loaded with these objects to reduce handling operations and enable loading of exactly the specified quantity of objects. This is thus a method which controls the quantity and quality of products distributed by means of a robot. Nevertheless, this method is not suitable either for processing a large number of orders in a very short period of time.

Also known in the prior art are devices for the distribution of products by identifying each product by reading an identification means of the bar code type. U.S. Pat. No. 5,881,890 discloses a device for distributing mail. It is constituted of an equipment unit having a multiplicity of compartments each associated with a signalization means, each signalization means being controlled in an unequivocal and definitive manner as a function of the product identification during handling. Each compartment corresponds to a single type of product and each type of product is associated with a single compartment.

This system is suited to sorting mail in which a compartment whose content is then distributed into a mail carrier bag intended for a locality only comprises mail of a single type, i.e., bearing the same postal code. This type of equipment, however, is not suitable for the preparation of specific orders in which each package contains articles different from that of the other packages.

SUMMARY OF THE INVENTION

This invention relates to a method of distributing products ($P_1, P_2, P_3, \ldots, P_y$, y being a whole number not equal to zero) enabling, by manipulation and displacement of the products, rapid collection of the products, each product having an identifier prior to shipment such that each final product collection corresponds to a list of products itself corresponding to a physical order ($C_1, C_2, C_3, \ldots, C_x$, x being a whole number not equal to zero), the products originating from one or more suppliers ($F_1, F_2, F_3, \ldots$) or one or more stocks ($S_1$), including a step of computer processing content of the orders ($C_1, C_2, C_3, \ldots, C_x$) including regrouping the orders into a multiplicity of groups of orders ($GC_{10}, GC_{20}, GC_{30}, \ldots$) according to at least one selected condition, and of ungrouping the content of each order group into a multiplicity of order subgroups ($SGC_{10}, SGC_{20}, SGC_{30}, \ldots$); m step(s) of regrouping of the products ($P_1, P_2, P_3, \ldots, P_y$), m being a whole number greater than or equal to 1, including performing a manual or automated collection of each of the products, reading the identifier of each collected product and provisionally arranging each collected product in a compartment associated with a group of products ($GP_{10}, GP_{20}, GP_{30}, \ldots$) to obtain an exact concordance between the product groups and the order groups, n step(s) of ungrouping the products ($P_1, P_2, P_3, \ldots, P_y$), n being a whole number greater than or equal to 1, including for each product group performing a manual or automated collection of each of the products, reading the identifier of each collected product and provisionally arranging each collected product in a compartment associated with a product subgroup ($SGP_{10}, SGP_{20}, SGP_{30}, \ldots$) to obtain an exact concordance between the product subgroups and the control subgroups, and a step of final separation including for each product subgroup performing a manual or automated collection of each of the products, reading the identifier of each collected product and provisionally arranging each collected product in a compartment associated with a physical order.

This invention also relates to a device for distributing products ($P_1, P_2, P_3, \ldots, P_y$, y being a whole number not equal to zero) such that each final collection of products itself corresponds to a list of products itself corresponding to a physical order (C1, C2, C3, . . . , Cx, x being a whole number not equal to zero), including at least one workroom including at least one sorting station equipped with an identification reader connected to a computer-based system to identify each product by reading an identifier and an equipment unit having a multiplicity of compartments to arrange the products in the compartments according to instructions issued by the computer-based system, each of the compartments having its position referenced by a signalizer controlled by the computer-based system, the computer-based system implementing a data processing step and the workroom enabling activation of steps of regrouping, ungrouping, final separation and, optionally, identification.

BRIEF DESCRIPTION OF THE DRAWINGS

The invention will be better understood from the description presented below on a purely explanatory basis of a mode of implementation of the invention with reference to the attached figures.

DETAILED DESCRIPTION

It will be appreciated that the following description is intended to refer to specific embodiments of the invention selected for illustration in the drawings and is not intended to define or limit the invention, other than in the appended claims.

This method is remarkable in that the following is performed:

at least one step of computer-based processing of the content of orders comprising regrouping the orders into a multiplicity of order groups according to at least one determined condition and of ungrouping the content of each order group into a multiplicity of order subgroups;

at least m step(s) of regrouping the products, m being a whole number greater than or equal to 1, comprising performing a manual or automated collection of each of the products, of reading the identification means of each collected product and of putting provisionally each collected product into a compartment associated with a product group to obtain an exact concordance between the product groups and the order groups, then at least n step(s) of ungrouping the products, n being a whole number greater than or equal to 1, consisting for each product group of performing a manual or automated collection of the of said products, of reading the identification means of each collected product and putting provisionally each collected product into a compartment associated with a product subgroup to obtain an exact concordance between the product subgroups and the order subgroups, then a final separation step consisting for each product subgroup of performing a manual or automated collection of each of the products, of reading the identification means of each collected product and of putting provisionally each collected product into a compartment associated with an order.

The invention thus pertains to a method according to which the orders and the products move towards each other.

More precisely, the method according to the invention proposes implementation of regroupings on the one hand of the products which must be made to correspond to the orders and on the other hand of the orders to be fulfilled to arrive at a reduced number of groups respectively of products and orders which correspond to each other exactly; i.e., the first product group comprises exactly all of the products necessary for fulfilling the orders of the first order group, etc.

Thus, for each product group/order group pair associated with implementation of concordance of the orders with the products that each order must contain, there is nothing remaining to do but to package the orders and ship them.

Prior to the regrouping step, there is preferably performed an advance identification step of the products comprising performing an unsequenced manual or automated collection of each of the products and of reading the identification means of each collected product. Subsequent to the identification step and prior to the regrouping step, there is preferably a removal from the set of orders of those which cannot be executed. The available products are then preferably allocated to an order according to at least one defined rule.

In a preferred embodiment, the numbers n and m are preferably optimized to be as small as possible taking into account the product-selection capacity of the human or automated operator.

In another embodiment, the ungrouping of the content of each order group into a multiplicity of order subgroups is performed according to at least one determined condition.

The steps of regrouping, ungrouping, final separation and optionally advance identification are preferably performed in a workroom constituted of at east one sorting station equipped on the one hand with an identification reader of the bar code type connected to a computer-based system for the identification of each product by reading of an identification means of the bar code type, and on the other hand of an equipment unit having a multiplicity of compartments for arranging in the compartments the products according to instructions issued by the computer-based system, each of the compartments having its location referenced by a signalization means controlled by the computer-based system. In a preferred embodiment, the steps of regrouping, ungrouping, final separation and optionally advance identification are performed in a single workroom by means of an identical device for each step.

The invention also pertains to a device for implementing the product distribution method according to the invention, such that each final product assembly corresponds to a product list itself corresponding to a physical order, comprising at least one workroom constituted at least one sorting station equipped on the one hand with an identification reader of the bar code reader type connected to a computer-based system for the identification of each product by reading an identification means of the bar code type, and on the other hand with an equipment unit having a multiplicity of compartments for arranging in the compartments of the products according to the instructions issued by the computer-based system, each of the compartments having its location referenced by a signalization means controlled by the computer-based system, the computer-based system performing the implementation of the data processing step and the workroom allowing for the implementation of the steps of regrouping, ungrouping, final separation and optionally identification.

The signalization means employed in the invention cannot in any manner be compared to or confused with the warning light employed in U.S. Pat. No. 5,881,890. In the prior art, the warning light is definitively associated with a binomial "product-compartment". In this invention, in contrast, the signalization means is not associated with a compartment. The same product would trigger the activation of a signalization means associated with a compartment A, then for the next product of the same nature, the activation of another signalization means associated with a compartment B different from compartment A. This is the reason for which—even if the signalization means are structurally comparable—they fulfill different functions and do not constitute equivalent means.

In the device according to the invention, the signalization means are not associated in an unequivocal manner with a specific compartment and a specific product, and the computer-based system comprises a digital table in which are recorded at least the identifier of an order, the composition of an order, an identifier of a compartment associated with the order and a digital flag indicating for each of the products composing the order whether or not it has already been stored, the computer-based system controlling the activation of one of the signalization means of a compartment as a function of the identifier of a product by the identification means and the membership of the product in the composition of an order group or order subgroup or an order associated with a compartment.

The equipment according to the invention preferably comprises at least one receiving workroom for the implementation of the optional advance step of identification and a division workroom for the implementation of the steps of regrouping, ungrouping and final separation, the workrooms each being constituted respectively of at least one sorting station equipped on the one hand with a microcomputer or similar device connected to said computer-based system and linked to an identification reader of the bar code type for the identification by reading of an identification means of the bar code type of each product and on the other hand an equipment unit having a multiplicity of compartments for the arranging in the compartments of the products according to the instructions issued by the microcomputer.

The compartments of the equipment unit preferably each comprise a position referencing module comprising, e.g., at least one light source, each position referencing module being linked directly or by the intermediary of other position referencing modules to the computer-based system preferably via the microcomputer, the position referencing module being implemented by the computer-based system preferably by the intermediary of the microcomputer for issuing an instruction of arranging an identified product in the position-referenced compartment.

The compartments of the equipment unit preferably each comprise a control means, each control means being linked directly or by the intermediary of other control means to the computer-based system preferably by the intermediary of the microcomputer, the implementation of the control means being controlled by the computer-based system preferably by the intermediary of the microcomputer to ensure that an identified product was arranged in the correct compartment.

The equipment preferably comprises sets of compartments constituting, e.g., rows of compartments or columns of compartments, each set of compartments comprising an identification means of the bar code type.

Each set of compartments is preferably constituted of at least one rail supporting a guiding system for the attachment of the position referencing modules.

Each set of compartments preferably comprises a multiplicity of infrared transmitters and a multiplicity of infrared receivers, the infrared transmitters and the infrared receivers being positioned respectively back to back.

Each compartment preferably has an identification means of the bar code type, e.g., in the form of a self-adhesive label. The equipment unit preferably has an identification means of the bar code type, e.g., in the form of a self-adhesive label.

The equipment moreover preferably comprises transport carriers for the transport of products originating from or with the destination of the workroom(s), each transport carrier comprising an identification means of the bar code type, e.g., in the form of a self-adhesive label.

The invention advantageously provides a computerized solution based on a software program and an entire group of material means for making it possible to fulfill large numbers of orders in a very short period of time and with a very high degree of reliability.

The material solution of the invention also advantageously integrates characteristic features making it modular and easily and quickly adaptable to numerous different solutions. The invention also advantageously enables management of orders of products originating from stocks or received on a just in time basis.

Let C be the set of orders to prepare.

Let PS be the set of products in stock required for the constitution of the orders; note that the set PS can be empty.

Let PF be the set of products arriving on a just in time basis necessary for the constitution of the orders; note that the set PF can be empty.

The preferred method according to the invention can be broken down into ten tasks:

Task 1: Investigation of the Theoretically Executable Orders

Comparison of PS with the files of the products in stock: determination of the subset PS1 of PS of the available articles. If this comparison is not possible or not performed then PS1=PS.

Comparison of PF with the files of the expected deliveries: determination of the subset PF1 of PF of the expected articles. If this comparison is not possible or not performed then PF1=PF.

Calculation of the subset C1 of CS of the executable orders using the subsets PS1 and PF1 with use of a priority rule among the orders for the orders containing products not available in sufficient quantity to fulfill the requirement.

If the priority rule does not exist then the presentation order is the priority order.

Creation by the system of an explicit or implicit injective relationship of the orders of the subset C1 with the products of the subsets PS1 and PF1, each product being implicitly associated with an order number.

Task 2: Registration and Classification Into Two Subsets of the Products Arriving on a Just in Time Basis If PF1 is not empty, by reading of the bar codes or any recognition system, identification of all of the products arriving on a just in time basis thereby constituting a subset PF2.

This subset can itself be composed of x subsets, e.g., one subset per supplier plus one more subset of the products remaining from a preceding operation.

This identification procedure can be simultaneous with other operations (see task 7).

Calculation of the subset PF3=PF1 intersection PF2 of the products actually arrived that can be used for the orders of C1.

Calculation of the subset PF4=PF2−PF3 of the products not used placed in advance or in stock.

Task 3: Calculation of the Executable Orders After Delivery of the Products Received on a Just in Time Basis Using the inverse relationship of the injection defined in task 1 calculation of the subset C3 of C1 of the executable orders from PS1 and PF3 and the subset C2 of C1 of the orders placed in advance with C1=C2 union C3.

Task 4: Calculation of the Collection of Products in Stock, Collection

If PS1 is not empty: calculation of the subset PS2 of PS1 of the products necessary for the orders of C3, then global collection in stock of the products of PS2, this collection can be made by subsets $PS2\_1, PS2\_2, \ldots, PS2\_Y$, each being calculated to optimize the pathways in the operation or to take into account the technical constraints of the products or other criteria.

Let PS3 be the set of the collected products optionally broken down into subsets $PS3\_1, PS3\_2, \ldots, PS3\_y$.

If PF1 and PS1 are not empty, the proposed order task 3 then 4 then 5 optimizes the method because of the generally stronger reliability of the knowledge of the products in stock. It is nevertheless possible to reverse tasks 3 and 4.

Task 5: Calculation of the Definitively Executable Orders

Using the inverse relationship of the injection defined in task 1 calculation of the subset C4 of C3 of the executable orders from PS3 and PF4 and of the subset C5 of the orders placed in advance with C3=C4 union C5. C5 is empty if one accepts the remainders.

The set P4=PS3+PF3 constitutes the set of the products used in the preparation of orders.

The sets C4 and P4 are the sets of data, orders and products which will be processed by the following tasks and constitute the logistical pairs orders-products, pairs represented mathematically by the injective relationships of C4 toward P4.

It is important to note that certain of the tasks 1 to 4 above could not be executed or could only be executed partially either because certain sets were empty or because it was considered that the quality of the stocks or the deliveries from suppliers did not allow comparison of the sets. A consequence is that certain injective relationships or inverse relationships can then point to empty subsets which corresponds to discards which harm the productivity of the method without preventing it.

Task 6: Breaking Down the Orders

The subset C4 is broken down according to the criteria linked the most often to the logistical constraints (delivery zone, delays, constraints on the products, size of the orders and the like) in n subsets:

$C4\_1, C4\_2, \ldots, C4\_N1$

If the order number is large, the subsets are themselves broken down into subsets $C4\_1\_1, C4\_1\_2, \ldots, C4\_1\_N2$, on the same criteria or different criteria.

One thereby defines n+1 levels of decomposition, the whole numbers $N1, N2, \ldots$ and n are essential parameters of the invention because they are adjusted to take into account the distribution capacity of the products under consideration by a human operator or a robot.

In practice, in manual processing, at the first level of decomposition, N is the order of 10, at the last level it can reach 100. N can be even larger with robots.

The parameter n can be from 0 to 5.

It is important to note that tasks 7 to 10 below are performed in workrooms which can be multiple, manual, partially automated or automated.

Task 7: First Selection-Expansion on the Products

It comprises taking set P4 and for each product to be expanded using the inverse relationship of the previously cited injection relationship, as many products of subset P4 as there are subsets of decomposition level 1 of the orders $C4\_1, C4\_2, C4\_N1$.

There would be creation of a new injection C4_N1/P4_N1.

It is possible but not obligatory to perform task 7 at the same time as task 2 for the products arriving on a just in time basis and thus to proceed as follows:

For the products PF2 distribute them using the injection C1 to PF1 and in placing in the discard box the products of the subset PF4. If PF2 was broken down into x subsets then one obtains x times N1 subsets PF3_x_N1 and corresponding injective relationships.

Then perform task 7 for the products of the subset PS3 itself composed of subsets $PS3\_1, PS3\_2, PS3\_Y$, yielding the subsets PS3_y_N1.

In practice it only takes place exceptionally that the set P4 is distributed in a single step.

The importance of the invention is thus to be able to constitute multiple subsets of PS3 or PF3 and thus to provide great flexibility to the method.

Task 8: First Regrouping

A regrouping is performed of the set of the subsets PF3_x_N1 and PS3_y_N1 on the criteria N thereby finding the subsets of base P4_N1.

Task 9: $n^{th}$ Selection-Expansion (or Regrouping)

For each of the following levels of the breaking down of the orders and of using the injective relationships of the preceding level, one expands again the products of the subsets P4_N1 into P4_N1_N2 subsets.

One obtains the injective relationships C4_N1_N2/P4_N1_N2.

It should be noted that during the second selection that the products of P4 which cannot be used are eliminated (due to the fact that the orders (C5) cannot be implemented due to the products that are not present in stock).

It is also possible at each selection to perform regroupings (example the single-product orders or the orders prepared at another time).

Task 10: Final Separation

Upon the final selection, the products are distributed to each of the unitary orders which then only require packaging in order to be shipped.

The execution of orders in a very short period of time, i.e., the effective shipping of ordered products according to the ordering party's orders, is a very important goal for the development of online shipping sites on the internet and generally speaking for mail-order sales.

Thus the orders received during the day are delivered:

For products in stock, when the orders are received before 10:00 a.m. of the day D: to be shipped in the evening for next day delivery (D+1);

For products to be delivered on a just in time basis: the orders are delivered 24 to 48 h later depending on the suppliers' delays.

The receipt of merchandise is generally carried out between 6:00 a.m. and 10:00 a.m. The merchandise is therefore available for preparation at 10:00 a.m.

The shipments must be executed prior to 6:00 p.m. (transporter's limitation for next-day delivery).

We can thus see that there are multiple constraints:

Specific Constraint No. 1: Delay of Preparation and Shipping in 4 to 8 h

Electronic commerce causes extremely high preparation quality levels, especially in direct sales to consumers or "B to C" or in the field of supplying spare parts.

Specific Constraint No. 2: Very Large Number of Orders

The present flow rates are moderate but under the pressure of electronic commerce this requirement will expand.

Specific Constraint No. 3: Very Large Number of References

The potential referencing is very large. Electronic commerce causes an enlargement of the references available for sales. It is no longer unusual to exceed 100,000 references. Moreover, the cost that would be represented by maintaining a stock of all of the references would be prohibitive in light of the ratio between the number of products in stock and the number of products sold.

Specific Constraint No. 4: Use of Just in Time Delivery

A large number of products are not available in large stock amounts but are manufactured upon request.

It is important to note that taken individually these constraints can be resolved but their cumulative force has generated until now a situation without a viable solution (cost, quality, delays).

The invention as described pertains to an equipment unit of a platform for preparation/execution of orders, e.g., for the distribution of orders regrouping multiple different products according to criteria applicable to each addressee.

The problem posed is to organize rigorously, rapidly and without errors the grouping together of the products on intermediary storage equipment units, from which the products will be collected for the preparation of each package according to a composition determined by an order form which is generally digital.

It is necessary to assemble a set of physical equipment units to resolve this problem:

equipment for the transport (e.g., carriers or carts with an identifier) and/or displacement (e.g., a conveyor belt) of products between two handling stations, and equipment for the selection and the temporary arrangement/storage of the products between two handling operations.

These equipment units are controlled by a computerized system receiving information originating from different identification means of markers affixed on the products as well as on the transport equipment.

Figure 1:
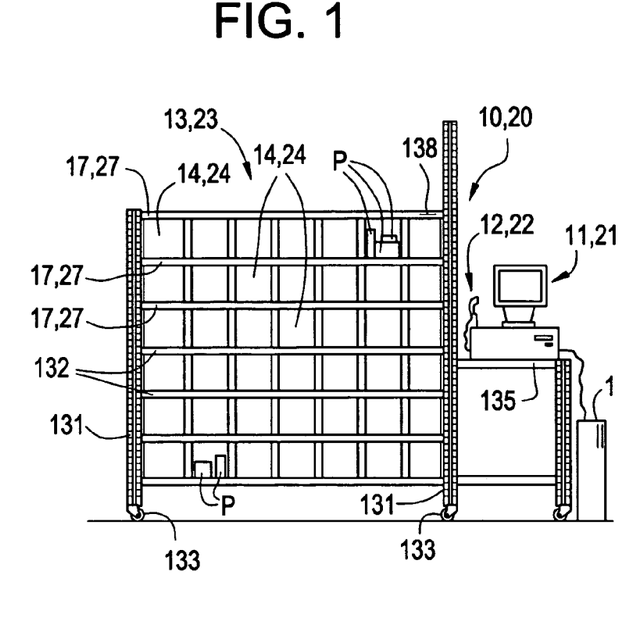
FIG. 1 illustrates a front view of a reception or expansion workroom.
Figure 2:
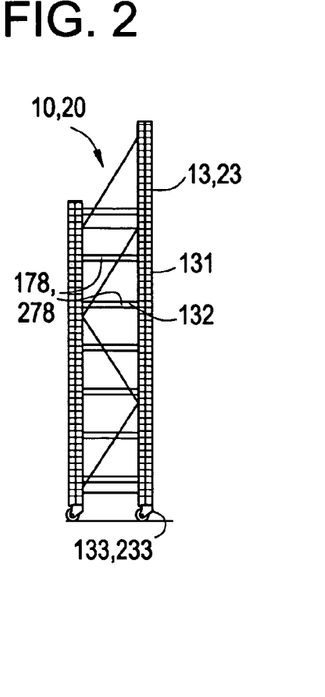
FIG. 2 illustrates a side view of the workroom of FIG. 1.

The equipment according to the invention for the preparation of a multiplicity of orders illustrated by FIGS. 1 and 2 comprises:

a computerized system (1); and at least one receiving workroom (10) and an expansion/distribution workroom (20).

The workroom is a physical zone in which are laid out one or more storage equipment units and if relevant the associated computer control means.

In the example shown and described, the receiving workroom (10) is distinct from the expansion workroom (20). It is nevertheless possible that a single workroom can be used simultaneously or successively for the functions of receiving and expansion.

Each receiving (10) and expansion (20) workroom comprises respectively: on the one hand a microcomputer (11, 21) or similar device connected to the computerized system (1) and on the other hand an equipment unit (13, 23). An identification reader (12, 22) of the bar code reader type, is connected to each microcomputer (11, 21) of each workroom for the identification reading of an identification means of the bar code type of each product. The identification readers (12, 22) can be connected directly to the computer-based system, i.e., without the intermediary of the microcomputers (11, 21).

Each equipment unit (13, 23) is constituted of a cabinet comprising a frame and a multiplicity of compartments (14, 21) for arranging the products P according to the instructions issued by the microcomputer. These compartments (14, 24) form rows or columns.

In the version illustrated, the compartments form boxes of identical dimensions. It is, however, possible to create in a single equipment unit boxes having different dimensions of width or height. The compartments can have a vertical back piece, but this is not obligatory. When there is no vertical back piece, the products P can be inserted from one side of the equipment unit and withdrawn from the opposite side.

In a traditional manner, each equipment unit is constituted of vertical supports (131) and transverse supports (132) connecting the vertical supports (131).

Each equipment unit is moreover preferably mounted on casters (133) to allow displacement of the equipment units within a workroom or from one workroom to another. Each equipment unit (13, 23) has an identification means (138) of the bar code type positioned, for example, on the front surface of the equipment unit as illustrated in FIG. 1. The computer (11, 21) is preferably positioned on a tablet (135) adjacent to the equipment unit (13, 23) used in the workroom.

Figure 3:
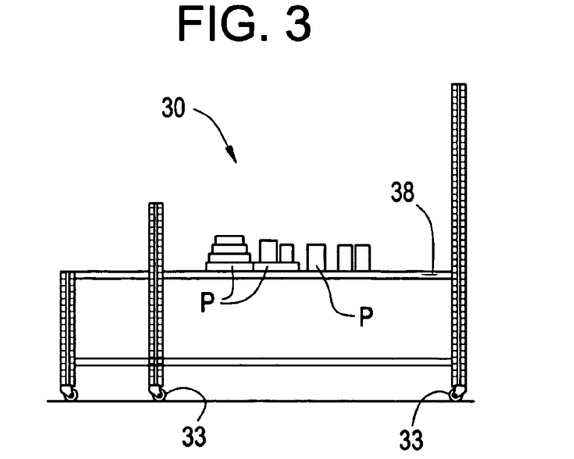
FIG. 3 illustrates a front view of a transport carrier.
Figure 4:
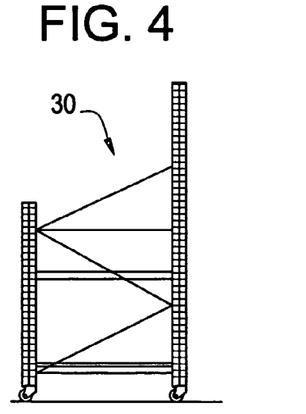
FIG. 4 illustrates a side view of the carrier of FIG. 3.

For the transport of the products, the equipment according to the invention also comprises a multiplicity of transport carriers or carts (30) illustrated in FIGS. 3 and 4 for transporting the products P originating from or to be distributed to the receiving workroom(s) (10) and the expansion workroom(s) (20).

Figure 5:
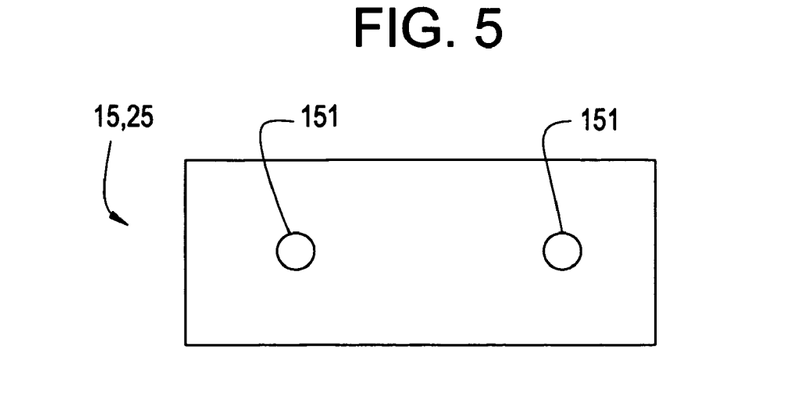
FIG. 5 illustrates a front view of a position referencing module without control.
Figure 6:
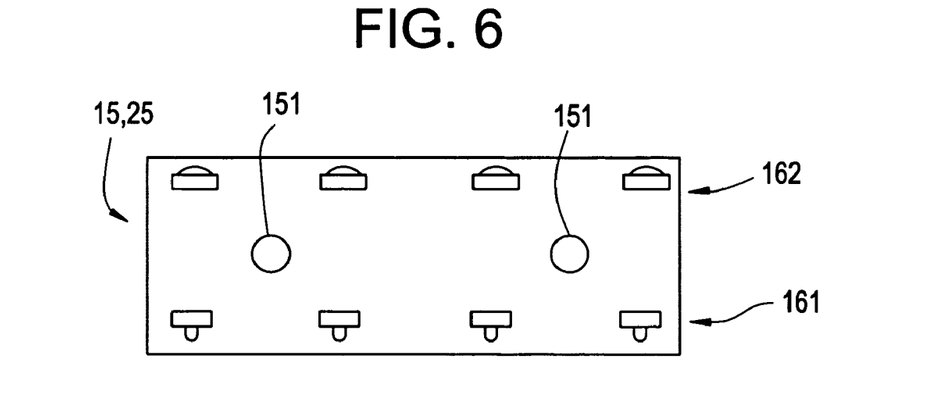
FIG. 6 illustrates a front view of a position referencing module with control.

Each transport cart comprises casters (33) and an identification means (38) of the bar code type positioned, e.g., on the front surface as can be seen in FIG. 3. The compartments (14, 24) of the equipment unit (13, 23) each comprise a position referencing module (15, 25) as illustrated in FIGS. 5 and 6 preferably positioned above each compartment (14, 24).

Figure 7:
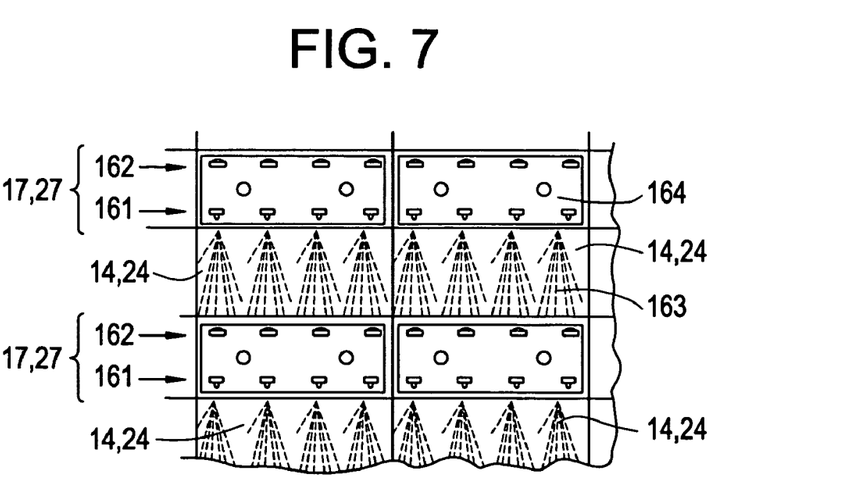
FIG. 7 illustrates a partial front view of an equipment unit comprising rows of position referencing modules with control.

Each position referencing module (15, 25) has a unique address which makes it possible to control it from the computer-based system (1) via the computer (11, 21). The compartments (14, 24) preferably form sets of compartments, constituting, e.g., rows of compartments (17, 27) or columns of compartments as illustrated in FIG. 7.

Each position referencing module (15, 25) comprises at least one light source (151). This light source can be a warning light or an LED diode associated with a specific compartment. When the computer (11, 21) calculates an instruction for depositing a previously identified product in a given compartment, it activates the light source (151) corresponding to the compartment. The operator is thereby informed of the compartment where the operator should deposit the product that the operator has just identified by means of the bar code reader without ambiguity. Each position referencing module (15, 25) is connected to the microcomputer (11, 21), the position referencing modules (15, 25) of an equipment unit (13, 23) being activated by this microcomputer for issuing an instruction for arranging an identified product in the referenced compartment. Thus, when the computer causes illumination of the light source, this means that the product which was identified by reading its bar code should be placed in the compartment of the position referencing module whose light source is illuminated.

The light source (151) remains illuminated until the bar code reader recognizes a new product presented by the operator. The computer (11, 21) then deactivates the light source (151) which has been illuminated and commands the illumination of the light source (151) corresponding to a new product to be arranged in the equipment unit in a compartment identical to or distinct from the preceding product.

In another embodiment, illustrated in FIG. 6, the compartments (14, 24) each comprises a control means (16, 26) of the positioning of a product in this compartment. This control means is preferably included in the position referencing module (15, 25). Each control means is preferably constituted of an infrared transmitter and an infrared receiver. This receiver is positioned essentially facing a transmitter of the other side of the compartment opening. More precisely, in a row of compartments (17, 27), each of the infrared transmitters (161) emit a coded beam (163) captured by a receiver belonging to the subjacent row of compartments (17, 27) as can be seen in FIG. 7. The distance between the transmitters or receivers of a row of compartments (17, 27) is on the order of 7 cm.

Thus, the beam of the transmitter(s) scans essentially the totality of the compartment entrance. The control means is positioned in a manner such that it is not possible to deposit a product P in the controlled compartment without this means being activated. The modules located at the top end of the equipment unit (13, 23) are of course configured differently from the others: the detection is not activated.

The activation of each control means (16, 26) is controlled by an electronic detection and signalization card (164) positioned in the row of compartments (17, 27) and connected to the microcomputer (11, 21) to ensure that an identified product was correctly arranged. Thus, if a luminous means of a compartment is illuminated after reading a bar code of a product, but it is the control means of another compartment that is activated, the light source of the correct compartment remains illuminated as long as the control means of this compartment has not been activated and it is not possible to read another bar code with the previously used reader in the workroom under consideration.

In contrast, if after the reading of the bar code of a product and illumination of a light source of a compartment the control means of this compartment is activated then the light source is extinguished and the bar code of the next product can be read.

Figure 8:
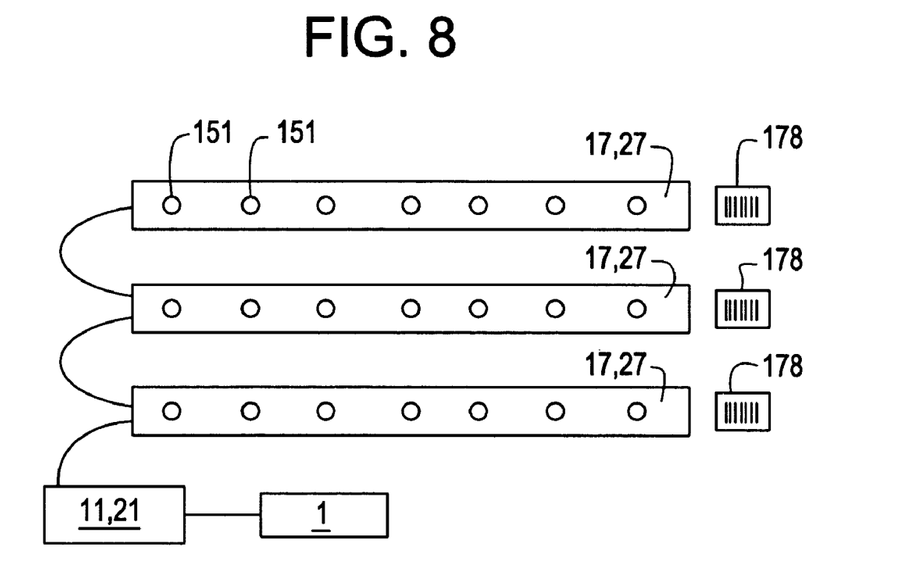
FIG. 8 illustrates a diagram of the connection of rows of position referencing modules.

Each set of compartments comprises an identification means (178) of the bar code type positioned, e.g., on the side of the equipment unit (13, 23) as illustrated in FIGS. 2 and 8, and connection means for being linked to the computer (11, 21) as illustrated in FIG. 8.

Figure 9:
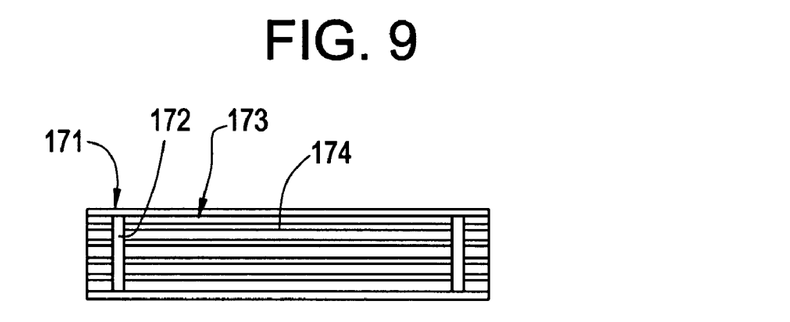
FIG. 9 illustrates a front view of a connection rail for a row of position referencing modules.

Each row of compartments (17, 27) is constituted by a horizontal rail (171) or strip supporting a guiding system (172) for the attachment of the position referencing modules (15, 25), at least one distribution bar (173) for carrying the electric current required for the implementation of the light source and possibly of the control means when it exists (low voltage on the order of 5 volts) and an insulating support (174) as illustrated in FIG. 9. The horizontal rails (171) thus each form what is called a "bus." These buses participate in the possibility of modulating the characteristics of the equipment according to the invention. They are attached on the transverse supports (132), but can also be attached on the vertical supports (131) of the equipment unit (13, 23).

These horizontal rails (171) are preferably attached in a detachable manner on the equipment unit (13, 23) and are interchangeable. For managing transmission of information, the horizontal rails (171) comprises an address manager which can be programmed on a manual or automated basis. The connections among the horizontal rails (171) can be wired or wireless (radio standard 802.11 a or b or Bluetooth standard).

Figure 10:
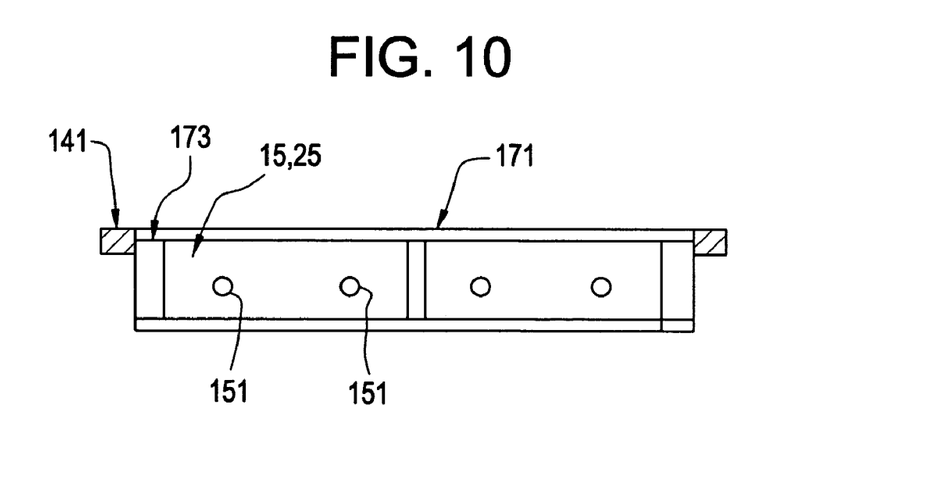
FIG. 10 illustrates a front view of a plate section equipped with two position referencing modules without control connected on a connecting rail.

FIG. 10 illustrates the positioning of two position referencing modules (15, 25) on a rail (171) in relation to a tray (141) of a compartment (14, 24). This tray is located in the top rear part of the rail (171).

Figure 11:
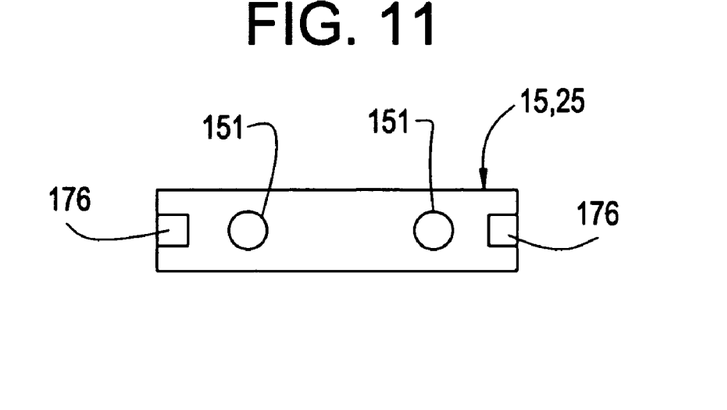
FIG. 11 illustrates a front view of a position referencing module without control presenting connectors at its ends.
Figure 12:
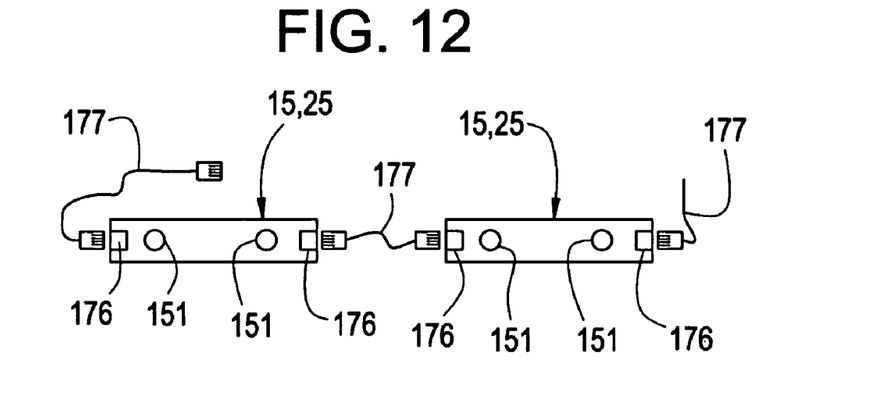
FIG. 12 illustrates a front view of an example of cabling of two position referencing modules.
Figure 13:
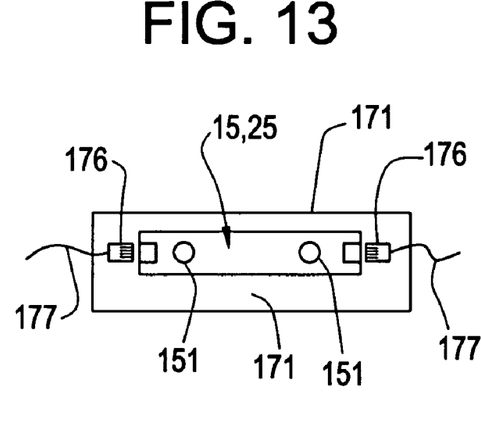
FIG. 13 illustrates a front view of a position referencing module positioned in an equipment unit.

Each position referencing module (15, 25) is also equipped with a female connector (176) at each of its lateral ends as can be seen in FIG. 11 to enable connections between the modules by means of cables (177) comprising male connectors at their ends and the computer as illustrated in FIG. 12.

When a position referencing module (15, 2) is defective, it can be replaced by an identical module very easily and very quickly. This operation only requires switching off the old module, unclipping it from the support rail, clipping it onto the support rail of the new module then the switching on the new module.

Figure 14:
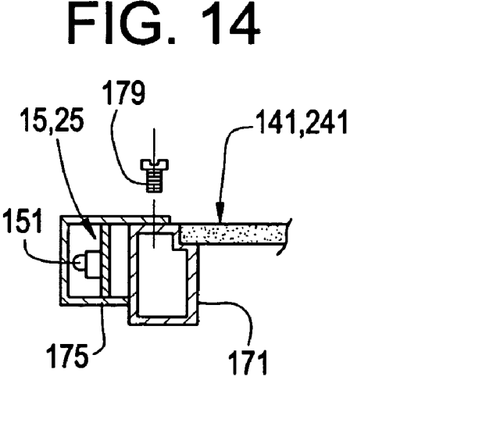
FIG. 14 illustrates a side view of the module of FIG. 13.

Each position referencing module (15, 25) is protected from accidental shocks by a protective cover (175) which can be seen in FIG. 14. This cover is made from a transparent plastic profile or comprises diffusion openings for the diffusion of the light emitted by the light sources (151) and by the infrared transmitters as applicable.

Attachment of the protective cover (175) on a horizontal rail (171) can be implemented with a screw (179) or any other fixation means.

The geographic position of the light sources designating the compartments is, of course, known by the computer-based system (1) or at minimum by the microcomputer (11, 21). Various solutions are possible to register the position: an electronic switch indicates the position of each light source, or only the position of the first light source of each row with the others following in sequence, or the material stores its address in memory by the reading of a bar code associated with the compartment and/or the light source and a computer-based procedure enables registration of the addresses. The number of light sources necessitates an addressing procedure involving two octets. The address is left up to the administrator of the strips and can easily be changed. This administrator no longer intervenes in the system except when new strips are installed.

Three levels of information cohabit for the activation of the detection of the depositing of an object in a compartment:

1—A new material for informing whether or not the material possesses detection ability, 2—A global level for globally activating or deactivating the detection and 3—A light source level.

The connection between the microcomputer and the strips is implemented by means of a serial port of the microcomputer at 9600 baud, 8 bit parity, 1 stop bit without flow control.

The information transmissions result in an identical return (echo).

Figure 15:
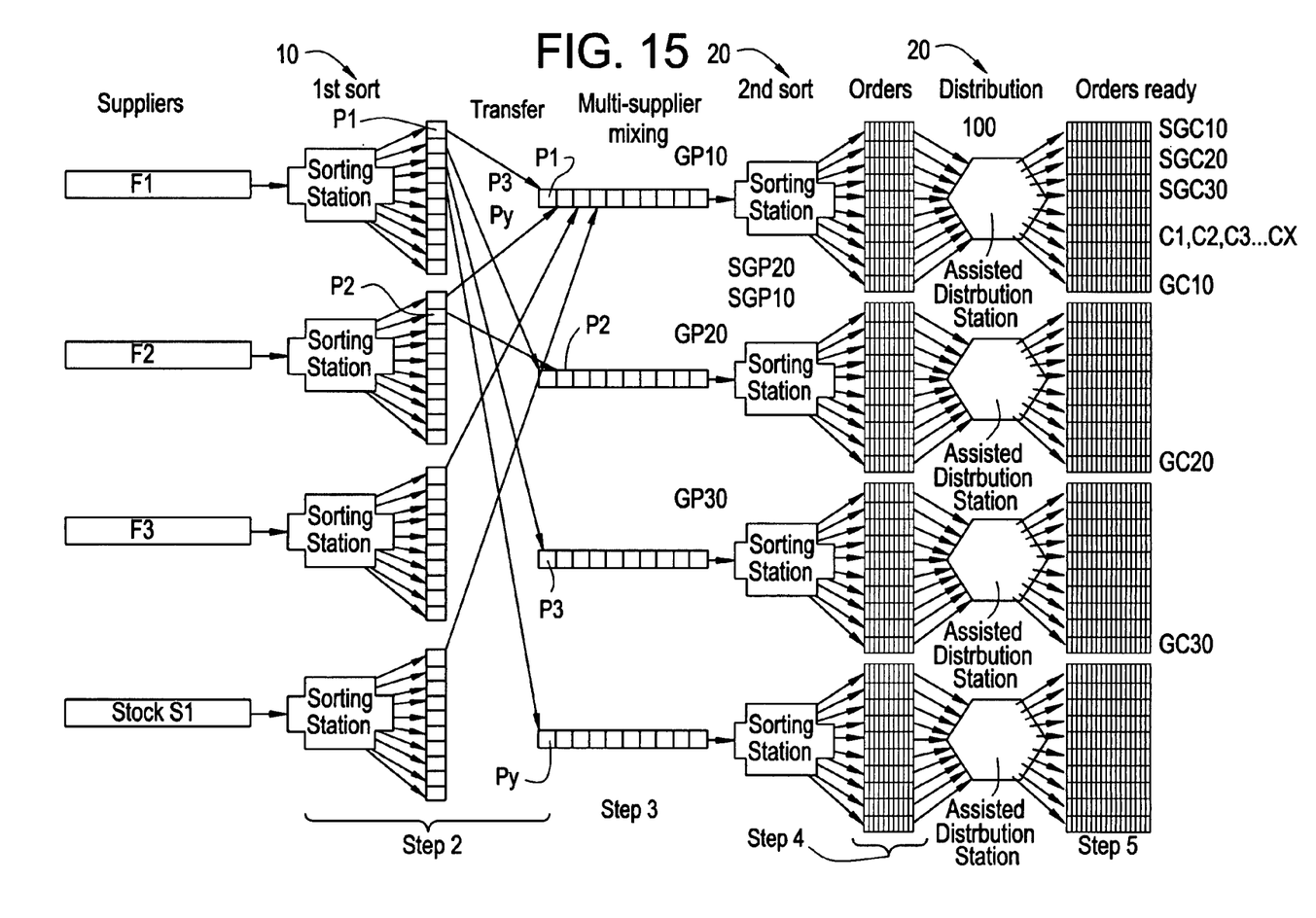
FIG. 15 illustrates a general diagram of the method according to the invention.

FIG. 15 illustrates the essential steps for the implementation of the method according to the invention.

Aspects of the method according to the invention thus comprise the following steps:

Advance

Verification of orders and deliveries to confirm that they are executable.

Statistical analyses and regrouping of the orders by 100 and groups of 10×100.

Physical receiving of deliveries and computer-based receiving by input of the references.

Merchandise transfer: the products are transported to the receiving/sorting stations and are put in place (unpacking).

$1^{st}$ Step: Organization of the Orders: Allocation of the Groups of Orders and Deliveries as Well as the Global Orders on Stocks to the Equipment to Obtain an Exact Concordance Between the Product Groups and the Order Groups (Fundamental Processing Step).

$2^{nd}$ Step: Step of Unitary Identification and Product Selection.

At each sorting station of the receiving workroom (10) the products originating from the supplier F1 or from stock S1 are taken one by one, scanned one by one and positioned in the distribution compartments corresponding to their respective groups of 10×100 orders. The placement rate is circa 1200 products/hour.

For this step, it is possible to position the products in the transport carriers or carts.

It is possible at this point to introduce controls and prepare histories.

$3^{rd}$ Step: $1^{st}$ selection and regrouping step (constitution of group)

At the moment of scanning of products at each station of the expansion workroom (20), the system determines the order to which the product is allocated, this order being part of a group of 100 and a group of 10 groups of 100 orders (cf. fundamental processing step). The first sort enables controlling the products and dividing them in a first round into 10.

$4^{th}$ Step: n Times the Unitary Identification and Selection Step

This involves repetition of the $3^{rd}$ step enabling preparation of the groups of 100 definitive orders, i.e., comprising all of the suppliers. The carriers of 100 orders are then available for distribution.

At the time of scanning the products, the system determines the order to which the product is allocated, this order being part of a group of 100 (cf. fundamental processing). The second sort as well as the subsequent sort enable processing the anomalies and a second division into 10.

$5^{th}$ Step: Final Distribution

The order fulfillment staff take the products one by one, scan them and distribute each one into a box of the distribution equipment unit. This preparation step is assisted by a system of lights each associated with a box. The control of depositing is performed by means of position referencing modules equipped with control means. In a preferred embodiment, this is done by scanning the compartment bar code.

At the time of scanning the products, the system finds the order to which the product is allocated, this order is allocated to a compartment of the distribution equipment unit. A light bulb is illuminated at the level of the corresponding box. The system validates depositing the product.

Final Step: Packing

The person assigned to pack the products, scans the distribution compartment; the accompanying documents (name and address of the addressee, etc.) are produced while this person packs the products. All that remains is to place the documents on the package for shipping.

During scanning of the box, the system launches the printings. In a preferred version, the system displays on the scanner or on any other means the content of the order allowing the packer to control the order. It is also possible to perform a final control during packing of the products by rescanning each bar code of each product. The system can also analyze the breakdown of the prepared orders (modification of the statutes), the anomalies and the discards to be returned to stock.

The invention was described above with reference to selected examples. It is understood that the expert in the field can create different embodiments of the invention without going beyond the scope of the invention as defined in the appended claims.

The invention claimed is:

1. A method of distributing products (P1, P2, P3, . . . , Py, y being a whole number not equal to zero) enabling, by manipulation and displacement of the products, rapid collection of the products, each product having an identifier prior to shipment such that each final product collection corresponds to a list of products itself corresponding to a physical order (C1, C2, C3, . . . , Cx, x being a whole number not equal to zero), the products originating from multiple suppliers (F1, F2, F3, . . . ) or multiple stocks (S 1), the method comprising:

a step of computer processing content of the orders (C1, C2, C3, . . . , Cx) comprising determining a regrouping of each of the orders into a multiplicity of groups of orders (GC 10, GC20, GC30, . . . ) according to at least one selected condition, and determining an ungrouping of the content of each order group into a multiplicity of order subgroups (SGC 10, SGC20, SGC30);

m step(s) of regrouping of the products (P1, P2, P3, . . . , Py), m being a whole number greater than or equal to 1, comprising performing a manual or automated collection of each of the products, reading the identifier of each collected product and provisionally arranging each collected product in a compartment associated with a group of products (GP10, GP20, GP30, . . . ) to obtain an exact concordance between the product groups and the order groups, wherein the products (P1, P2, P3, . . . , Py) are mixed from said multiple suppliers or stocks to form the groups of products and the orders, each group of products fulfilling a group of an order, and each order comprised of products (P1, P2, P3, . . . , Py) from said multiple supplier or stocks; and n steps of ungrouping the products (P1, P2, P3, . . . , Py), n being a whole number greater than 1, from each of the groups of products, the n steps of ungrouping comprising (i) at least one intermediate step of ungrouping comprising for each product group performing a manual or automated collection of each of the products, reading the identifier of each collected product and provisionally arranging each collected product in a compartment associated with a product subgroup (SGP10, SGP20, SGP30, . . . ) to obtain an exact concordance between the product subgroups and the order subgroups, and (ii) a last step of ungrouping comprising a step of final separation comprising for each product subgroup performing a manual or automated collection of each of the products, reading the identifier of each collected product and provisionally arranging each collected product in a compartment associated with a physical order;

wherein the steps of regrouping, ungrouping, final separation, and identification are performed in a single workroom by an identical device for each step comprising at least one sorting station equipped with an identification reader connected to a computer-based system to identify each product by reading an identifier and an equipment unit having a multiplicity of compartments for arranging the products in the compartments according to instructions issued by the computer-based system, each of the compartments having its position referenced by a signalizer controlled by the computer-based system.

2. The method according to claim 1, further comprising performing, prior to the m step(s) of regrouping, an advance identification step of the products (P1, P2, P3 . . . Py) comprising performing an unsequenced manual or automatic collection of each of the products and reading the identification means of each collected product.

3. The method according to claim 1, further comprising subsequent to the identification step and prior to the m step(s) of regrouping, withdrawing non-executable orders from the set of orders.

4. The method according to claim 3, wherein available products are allocated to an order according to at least one defined rule.

5. The method according to claim 1, wherein the numbers n and m are optimized to be as small as possible, taking into account product selection capacity of a human or automated operator.

6. The method according to claim 1, wherein the ungrouping of the content of each order group (GC10, GC20, GC30, . . . ) into a multiplicity of order subgroups (SGC10, SGC20, SGC30, . . . ) is performed according to at least one selected condition.

7. The method according to claim 1, wherein the steps of regrouping, ungrouping, final separation and optionally advance identification are performed in a single workroom by an identical device for each step.

8. A device for distributing products (P1, P2, P3, . . . , Py, y being a whole number not equal to zero) such that each final collection of products itself corresponds to a list of products itself corresponding to a physical order (C1, C2, C3, . . . , Cx, x being a whole number not equal to zero), the products originating from multiple suppliers (F1, F2, F3 . . . ) or multiple stocks (S 1) the device comprising: a single workroom comprising at least one sorting station equipped with an identification reader connected to a computer-based system to identify each product by reading an identifier and an equipment unit having a multiplicity of compartments to arrange the products in the compartments according to instructions issued by the computer-based system, each of the compartments having its position referenced by a signalizer controlled by the computer-based system, the computer-based system implementing a data processing step and the workroom enabling activation of steps of regrouping, ungrouping, final separation and, optionally, identification, wherein the products (P1, P2, P3 . . . , Py) are mixed from said multiple suppliers or stocks to form groups of products (GP10, GP20, GP30, . . . ) and the orders, each group of products fulfilling a group of an order, and each order comprised of products (P1, P2, P3 . . . Py) from said multiple suppliers or stocks, wherein the steps of regrouping, ungrouping, final separation and, optionally, identification are performed by an identical device for each step.

9. The device according to claim 7, wherein the signalizer is not associated in an unequivocal manner with a specific compartment and a specific product, and the computer-based system comprises a digital table in which are registered at least an identifier of an order, composition of an order, an identifier of a compartment associated with the order and a digital flag indicating for each of the products composing the order whether or not it has already been stored, the computer-based system controlling activation of the signalizer of a compartment as a function of the identifier of a product by the identifier and membership of the product in the composition of an order group, an order subgroup or an order associated with a compartment.

10. The device according to claim 8, wherein an optional advance identification step and steps of regrouping, ungrouping and final separation are implemented in the workroom, the workroom comprising at least one sorting station equipped with a microcomputer or similar device connected to the computer-based system and linked to an identification reader to identify by reading an identifier of each product and an equipment unit having a multiplicity of compartments to arrange the products in the compartments according to instructions issued by the microcomputer.

11. The device according to claim 8, wherein the compartments of the equipment unit each comprise a position referencing module comprising at least one light source, each position referencing module being connected directly or via an intermediary of other position referencing modules to the computer-based system by an intermediary of the microcomputer, the position referencing module being activated by the computer-based system via an intermediary of the microcomputer to issue an instruction to arrange an identified product in the thereby position-referenced compartment.

12. The device according to claim 8, wherein the compartments of the equipment unit each comprise a controller, each controller being connected directly or via an intermediary of another controller to the computer-based system, via an intermediary of the microcomputer, activation of the controller being controlled by the computer-based system via an intermediary of the microcomputer to ensure that an identified product is correctly arranged.

13. The device according to claim 8, further comprising sets of compartments comprising rows of compartments or columns of compartments, each set of compartments comprising a bar code identifier.

14. The device according to claim 13, wherein each set of compartments comprises at least one rail supporting a guiding system for attachment of position referencing modules.

15. The device according to claim 13, wherein each set of compartments comprises a multiplicity of infrared transmitters and a multiplicity of infrared receivers, the infrared transmitters and the infrared receivers being positioned, respectively, back to back.

16. The device according to claim 8, wherein each compartment has a bar code identifier.

17. The device according to claim 8, wherein the equipment unit has a bar code identifier.

18. The device according to claim 8, further comprising transport carriers to transport the products originating from or with a destination of a workroom(s), each transport carrier comprising a bar code identifier.

19. A method of distributing products (P1, P2, P3, . . . , Py, y being a whole number not equal to zero) enabling, by the manipulation and displacement of the products, rapid collection of the products, each product having an identifier prior to their shipment such that each final product collection corresponds to a list of products itself corresponding to a physical order (C1, C2, C3, ..., Cx, x being a whole number not equal to zero), the products originating from multiple suppliers (F1, F2, F3, ...) or multiple stocks (S 1), the method comprising:

processing content of the orders (C1, C2, C3, ..., Cx) by determining a regrouping of the orders into a multiplicity of groups of orders (GC10, GC20, GC30, ...) according to at least one selected condition, and determining an ungrouping of the content of each order group into a multiplicity of order subgroups (SGC 10, SGC20, SGC30);

regrouping the products (P1, P2, P3, ..., Py) in m step(s), m being a whole number greater than or equal to 1, by performing a manual or automated collection of each of the products, reading the identifier of each collected product and provisionally arranging each collected product in a compartment associated with a group of products (GP10, GP20, GP30, ...) to obtain concordance between the product groups and the order groups, wherein the products (P1, P2, P3, ..., Py) are mixed from said multiple suppliers or stocks to form the groups of products (GP10, GP20, GP30, ...) and the orders, each group of products fulfilling a group of an order, and each order comprised of products (P1, P2, P3, ..., Py) from said multiple supplier or stocks; and ungrouping the products (P1, P2, P3, ..., Py) in n steps, n being a whole number greater than 1, from each of the groups of products, the n steps of ungrouping comprising (i) at least one intermediate step of ungrouping by performing a manual or automated collection of each of the products for each product group, reading the identifier of each collected product and provisionally arranging each collected product in a compartment associated with a product subgroup (SGP10, SGP20, SGP30, ...) to obtain concordance between the product subgroups and the order subgroups, and (ii) a last step of ungrouping comprising performing a final separation for each product subgroup by manually or automatically collecting each of the products, reading the identifier of each collected product and provisionally arranging each collected product in a compartment associated with a physical order; wherein the steps of regrouping, ungrouping, final separation, and identification are performed in a single workroom by an identical device for each step.

\* \* \* \* \*